United States Patent [19]

Kosukegawa

[11] Patent Number: 5,630,029
[45] Date of Patent: May 13, 1997

[54] DATA TRANSFER SYSTEM FOR TRANSFERRING DATA FROM A DATA TRANSMISSION APPARATUS TO A DATA RECEPTION APPARATUS VIA A PARALLEL INTERFACE, AND DATA TRANSFER SYSTEM FOR PRINTER USING THIS DATA TRANSFER SYSTEM

[75] Inventor: Masanori Kosukegawa, Mishima, Japan

[73] Assignee: Kabushiki Kaisha TEC, Shizuoka, Japan

[21] Appl. No.: 195,925

[22] Filed: Feb. 14, 1994

[30] Foreign Application Priority Data

| Feb. 15, 1993 | [JP] | Japan | 5-025538 |
| Nov. 9, 1993 | [JP] | Japan | 5-279813 |

[51] Int. Cl.$^6$ .................................................. G06K 15/00
[52] U.S. Cl. .................................................. 395/114; 395/113
[58] Field of Search ........................... 395/101, 112, 395/114, 113, 500, 821, 824, 828, 835, 837, 838, 839, 840, 841, 882, 892; 358/406, 404, 436; 347/142, 19; 355/203, 204, 205, 206, 207, 208, 209

[56] References Cited

U.S. PATENT DOCUMENTS

| 4,426,166 | 1/1984 | Bowling | 395/114 |
| 4,635,222 | 1/1987 | Tokui et al. | 395/114 |
| 4,954,968 | 9/1990 | Yamaguchi et al. | 395/112 |
| 5,140,675 | 8/1992 | Okada | 395/114 |
| 5,185,853 | 2/1993 | Cheng et al. | 395/114 |
| 5,255,986 | 10/1993 | Koiwai | 395/114 |
| 5,328,278 | 7/1994 | Kokubo | 395/114 |
| 5,408,614 | 4/1995 | Thornton et al. | 395/275 |
| 5,418,891 | 5/1995 | Yang | 395/114 |
| 5,430,554 | 7/1995 | Konakai | 395/114 |

FOREIGN PATENT DOCUMENTS

| 0501489A1 | 9/1992 | European Pat. Off. . |
| 63-020517 | 1/1988 | Japan . |
| 1237821 | 9/1989 | Japan . |
| 2-76346 | 3/1990 | Japan . |
| 2252888 | 8/1992 | United Kingdom . |

OTHER PUBLICATIONS

EDN Electrical Design News, vol. 37, No. 2, Jan. 20, 1992, Newton, Massachusetts, US, pp. 121–128, Singhal, "Programmable Device Masters the Art of High-Speed Data Transfers".

DATABASE WPI, Week 9303, Derwent Publications Ltd., London, G.B., AN 93-026334 & TP129201 (Anon).

Primary Examiner—Edward L. Coles, Sr.
Assistant Examiner—Dov Popovici
Attorney, Agent, or Firm—Frishauf, Holtz, Goodman, Langer & Chick

[57] ABSTRACT

A data transfer system uses a Centronics compatible parallel interface having a plurality of control signal lines to transfer signals, such as Auto Feed, Select In, PError, nFault, Select and Strobe, and a data line for parallel transfer of data having a predetermined bit width, and starts high-speed data transfer at the timing of a change in level of the signal Auto Feed, Select In, PErrot, nFault, Select or Strobe. In the high-speed data transfer mode, the data transfer system transfers data in parallel to the printer at the time when the signal Strobe changes its level.

4 Claims, 11 Drawing Sheets

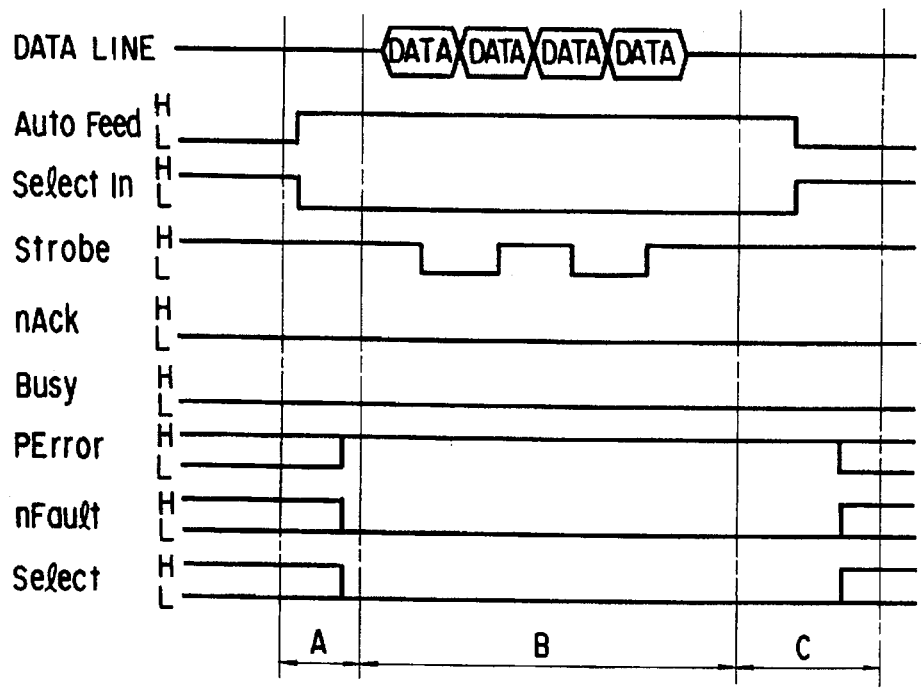
F I G. 2
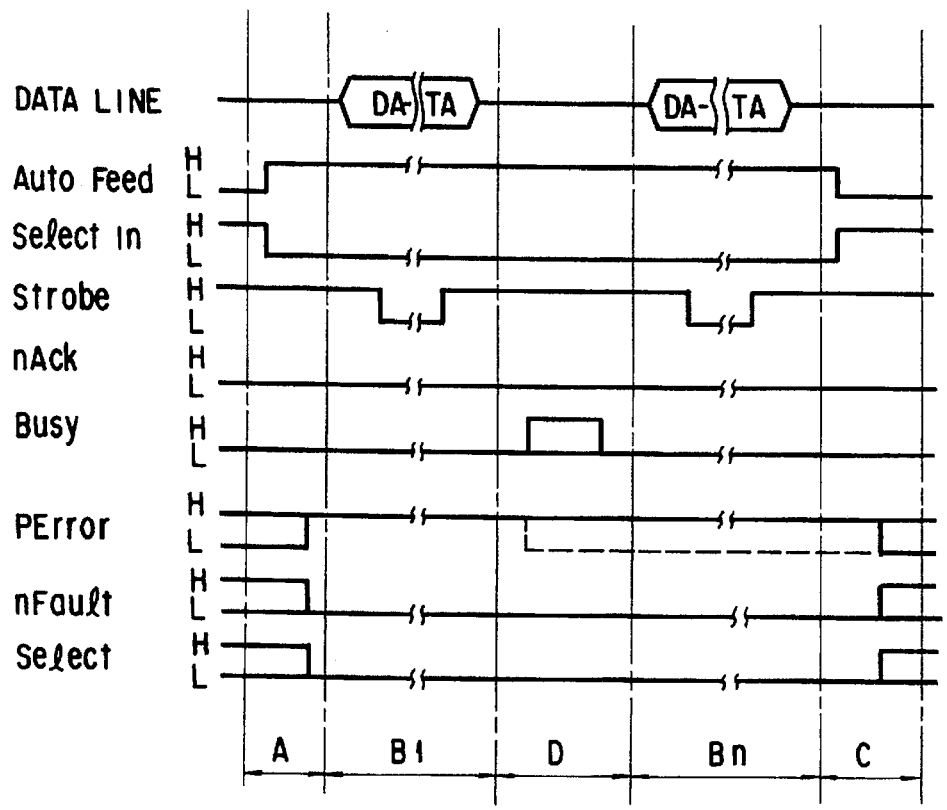
F I G. 3

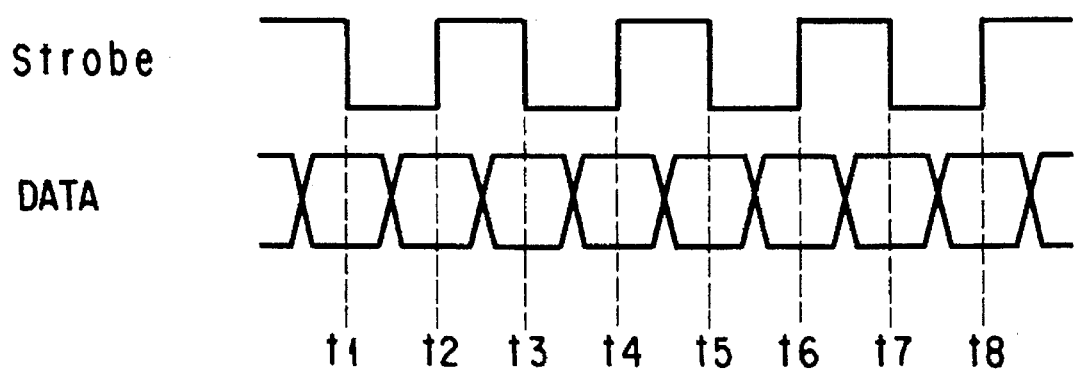
F I G. 8
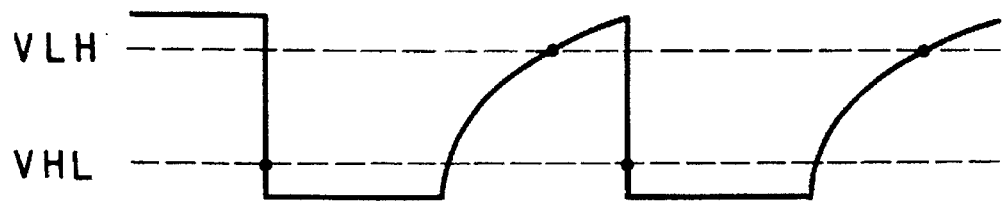
F I G. 9A
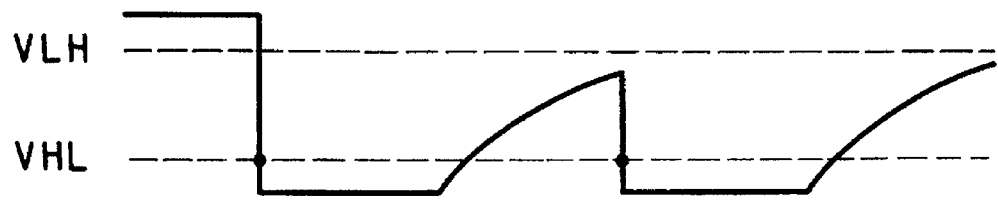
F I G. 9B

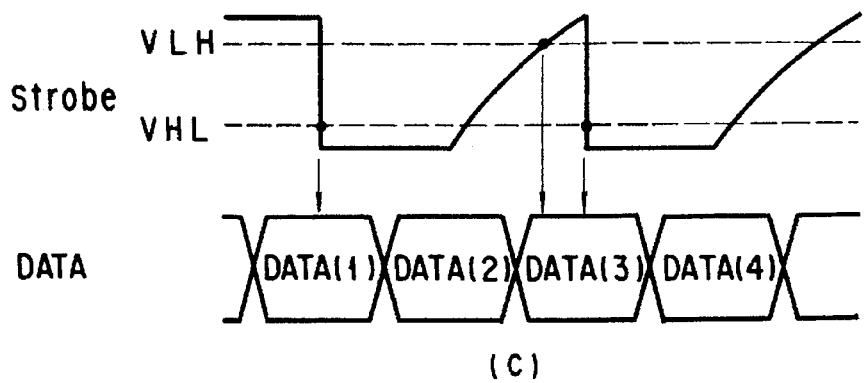
F I G. 10 (C)
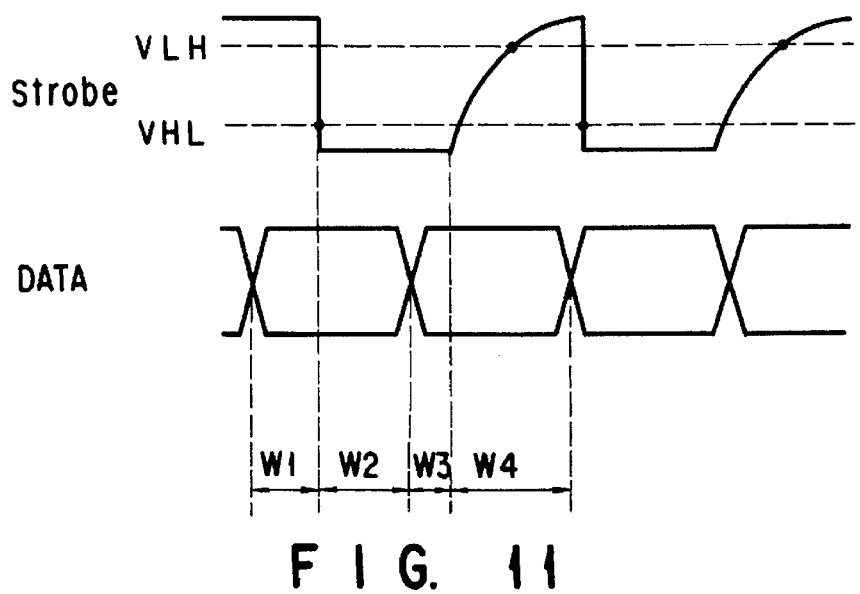
F I G. 11
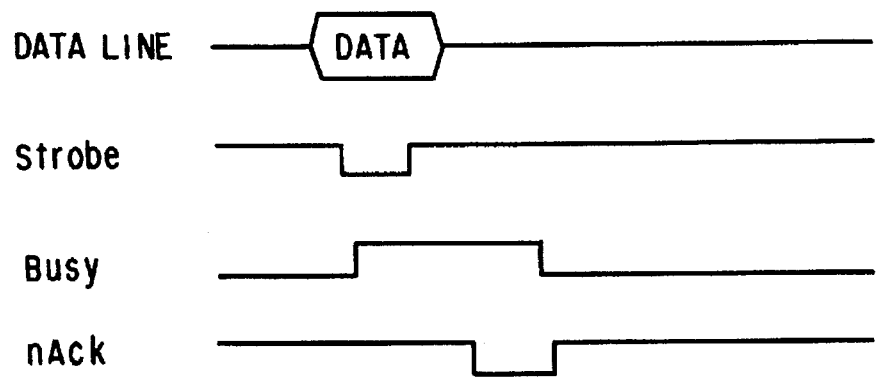
F I G. 15

DATA TRANSFER SYSTEM FOR TRANSFERRING DATA FROM A DATA TRANSMISSION APPARATUS TO A DATA RECEPTION APPARATUS VIA A PARALLEL INTERFACE, AND DATA TRANSFER SYSTEM FOR PRINTER USING THIS DATA TRANSFER SYSTEM

BACKGROUND OF THE INVENTION

1. Field of the Invention

The present invention relates to a data transfer system for transferring data from a data transmission apparatus to a data reception apparatus via a parallel interface, and a data transfer system for printer, which uses this data transfer system.

2. Description of the Related Art

A host computer, such as a personal computer, prepares data and sends it to a printer. The printer edits the received data from the host computer and print it out.

A data transfer system, which comprises a host computer and a printer, controls data exchange between the host computer and printer using an interface apparatus.

Interface apparatuses used in such a system typically use a Centronics compatible parallel interface.

In sending data to a printer from a host computer using a Centronics compatible parallel interface, the host computer sets data (DATA) byte by byte on a data line of its own interface, as shown in FIG. 15.

When the DATA is set, the host computer then changes a signal Strobe on a control signal line to a low level from a high level.

When detecting this level change, the printer sets a signal Busy on another control signal line to a high level and receives the DATA from the host computer.

When data reception is complete, the printer sets an signal nAck on another control signal line to a low level.

When the signal Busy on its control signal line is at a high level, the host computer stops sending data to the printer. When detecting that the signal nack on its control signal line becomes a low level, the host computer confirms that the printer has received the data, and prepares for transmission of the next data to the printer.

Popular printers for use in a system, which comprises a host computer and a printer, receive a vast amount of data from the host computer and print the data, such as a monochrome laser printer and a color laser printer.

Such printers are demanded to print a variety of data from mainly characters to characters mixed with graphics or image data, and the amount of data the printers handle tends to ever increases.

Laser printers, different from ordinary wire or thermal dot printers, employ an electronic photographic system in their print mechanisms, so that printing, once started, cannot be controlled to be temporarily stopped.

To use a low-speed interface to send data from a host computer to a printer, therefore, the printer is provided with a memory with a one-page capacity, called a page memory, so that the printer stores all the received data from the host computer into this page memory and then activates the print mechanism to print that data.

To print data of A4 size at 300 dpi, for example, the page memory needs a capacity of about 1 megabytes.

Conventional Centronics compatible parallel interfaces are a low-speed type that takes time in data transmission, thus requiring that printers be provided with a large-capacity page memory. This will inevitably increase the cost.

When an ink-jet printer or a thermal printer which uses a line head system to ensure fast printing is used as a printer, a Centronics compatible parallel interface, if used, takes time in data transmission, preventing the printer from sufficiently demonstrating its fast-printing performance.

SUMMARY OF THE INVENTION

It is therefore a primary objective of the present invention to provide a data transfer system which uses a parallel interface capable of transmitting data at a high speed.

It is another objective of the present invention to provide a data transfer system which uses a parallel interface capable of transmitting data at a high speed to thereby eliminate the need for a large-capacity memory like a page memory, thus contributing to reducing the cost of printer, and to improve the printing speed.

To achieve the foregoing objectives, according to one aspect of this invention, there is provided a data transfer system for transferring data from a data transmission apparatus to a data reception apparatus via a parallel interface, the parallel interface including a plurality of control signal lines for signal transfer and a data line for parallel transfer of data having a predetermined bit width, and the data transmission apparatus comprising high-speed transfer means for changing a level of a data transmission signal to be sent over one of the plurality of control signal lines, and transferring data in parallel to the data reception apparatus over the data line at a timing of that level change; and state transition means for changing levels of signals to be sent over the plurality of control signal lines to predetermined states to cause the high-speed transfer means to start or end high-speed transfer.

In this data transfer system, the parallel interface is a Centronics compatible parallel interface, and the high-speed transfer means changes a level of a signal Strobe, and transfers data in parallel to the data reception apparatus over the data line at a timing of that level change.

In the data transfer system, the parallel interface is a Centronics compatible parallel interface, and the state transition means of the data transmission apparatus permits the high-speed transfer means to start or end high-speed transfer in accordance with a level change in a signal Auto Feed, a signal Select In, a signal PErrot, a signal nFault or a signal Select.

According to another aspect of this invention, there is provided a data transfer system for transferring data from a data transmission apparatus to a data reception apparatus via a parallel interface, the parallel interface including a plurality of control signal lines for signal transfer and a data line for parallel transfer of data having a predetermined bit width, the data transmission apparatus comprising means for sending test data to the data reception apparatus; means for determining a delay time at a time of transmitting data, based on a result of discrimination of a reception status of test data, received from the data reception apparatus; high-speed transfer means for delaying data to be sent based on the delay time determined by the determining means, changing a level of a data transmission signal to be sent over one of the plurality of control signal lines, and transferring data in parallel to the data reception apparatus over the data line at a timing of that level change; and state transition means for changing levels of signals to be sent over the plurality of control signal lines to predetermined states to cause the high-speed transfer means to start or end high-speed transfer; and the data reception apparatus including data discriminating means for receiving test data from the data transmission apparatus, discriminating a reception status of the test data and sending a discrimination result to the data transmission apparatus.

According to a further aspect of this invention, there is provided a data transfer system for transferring data from a data transmission apparatus to a printer via a parallel interface, the parallel interface including a plurality of control signal lines for signal transfer and a data line for parallel transfer of data having a predetermined bit width, the data transmission apparatus comprising high-speed transfer means for transferring data in parallel to the printer over the data line at a timing at which a data transmission signal to be sent over one of the plurality of control signal lines changes its level; state transition means for changing levels of signals to be sent over the plurality of control signal lines to predetermined states to cause the high-speed transfer means to start or end high-speed transfer; and synchronous control and error monitoring means for dividing data to be sent to the printer into blocks and performing synchronous control and error monitoring for each block, whereby the printer prints data, received via the parallel interface block by block.

In this data transfer system, the data transmission apparatus comprises means for sending a test transfer command including test data to the printer means for determining a delay time at a time of transmitting data, based on a result of discrimination of a reception status of test data, received from the printer; highspeed transfer means for delaying data to be sent based on the delay time determined by the determining means, changing a level of a data transmission signal to be sent over one of the plurality of control signal lines, and transferring data in parallel to the printer over the data line at a timing of that level change; and state transition means for changing levels of signals to be sent over the plurality of control signal lines to predetermined states to cause the high-speed transfer means to start or end high-speed transfer; and the printer includes data discriminating means for receiving test data from the data transmission apparatus, discriminating a reception status of the test data and sending a discrimination result to the data transmission apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a diagram showing timings for a data line and control signal lines for explaining the basic operation of an interface device used in this embodiment;

FIG. 3 is a diagram, like FIG. 2, showing timings for the data line and control signal lines for explaining the basic operation of the interface device used is this embodiment;

FIG. 8 is a diagram for explaining problems at the time of data transmission between the parallel interfaces in this embodiment;

FIG. 9A is a waveform diagram illustrating a signal Strobe in this embodiment having reached a high-level detection level VLH;

FIG. 9B is a waveform diagram illustrating that the signal Strobe in this embodiment has not reached the high-level detection level VLH;

FIG. 10 is a diagram, like FIG. 8, for explaining problems at the time of data transmission between the parallel interfaces in this embodiment;

FIG. 11 is a diagram showing the relation among a change in the signal Strobe, data timing and a delay time;

FIG. 15 is a diagram showing timings for a data line and control signal lines for explaining the basic operation of a conventional parallel interface device.

DETAILED DESCRIPTION OF THE PREFERRED EMBODIMENTS

Figure 1:
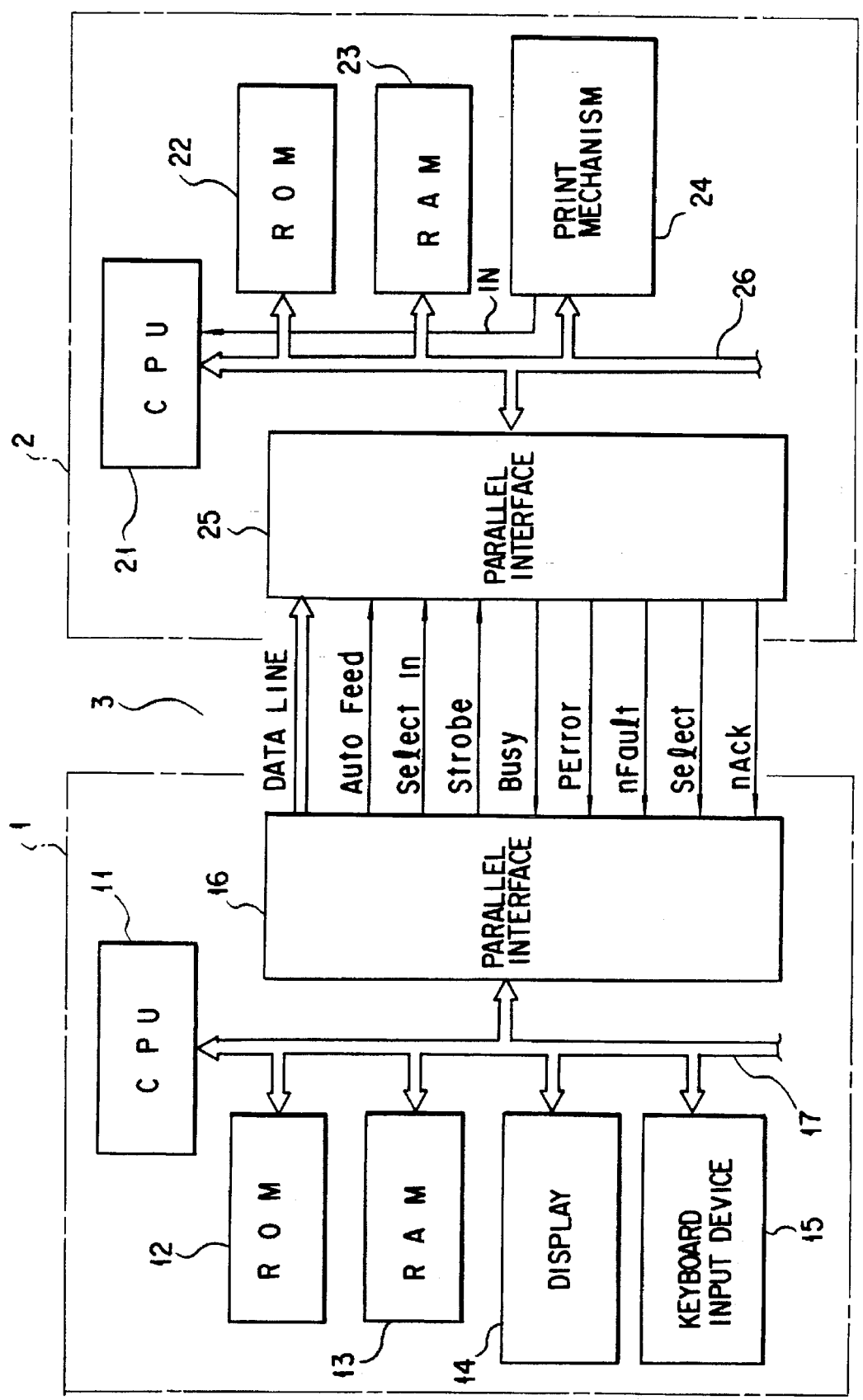
FIG. 1 is a circuit block diagram illustrating one embodiment.

As shown in FIG. 1, a host computer 1 outputs print data, externally input or prepared by internal processing, to a laser printer 2 via a line 3.

The host computer 1 includes a CPU (Central Processing Unit) 11 constituting the essential portion of its control section, a ROM (Read Only Memory) 12 holding program data, a RAM (Random Access Memory) 13 for storing print data to be transmitted, etc., a display unit 14 such as a CRT display unit, a keyboard unit 15 and a parallel interface 16.

The CPU 11 controls the RAM 13, display unit 14, keyboard 15 and parallel interface 16 based on the program data in the ROM 12.

The CPU 11, ROM 12, RAM 13, display unit 14, keyboard unit 15 and parallel interface 16 are electrically connected to one another by a bus line 17. The laser printer 2 includes a CPU 21 constituting the essential portion of its control section, a ROM 22 holding program data, a RAM 23 for storing received print data, etc., an electronic photograph type print mechanism 24, which includes a photosensitive drum, an exposure unit, a charger and a developer, and a parallel interface 25.

The CPU 21 controls the RAM 23, print mechanism 24 and parallel interface 25 based on the program data in the ROM 22.

The CPU 21, ROM 22, RAM 23, print mechanism 24 and parallel interface 25 are electrically connected to one another by a bus line 26.

The parallel interfaces 16 and 25 together with the line 3 constitute an interface device.

The line 3, which connects both interfaces 16 and 25 together, consists of eight control signal lines for sending signals and a data line for sending data (DATA) in parallel, which has a predetermined bit width, e.g., 8 bits.

The control signal lines include control signal lines for sending signals Auto Feed, Select In and Strobe to the interface 25 of the printer 2 from the interface 16 of the host computer 1; the signal Strobe indicates data transmission. The control signal lines also include control signal lines for sending signals Busy, PErrot, nFault, Select and hack to the interface 16 of the host computer 1 from the interface of the printer 2.

The CPU 11 of the host computer 1 outputs print data, stored in the RAM 13, or a command to the display unit 14 to be displayed and to the interface 16, based on the data (DATA) entered from, for example, the keyboard unit 15.

The interface 16 of the host computer 1 sends the print data and command from the CPU 11 to the interface 25 of the printer 2 via the line 3.

When the interface 25 receives the print data, the CPU 21 of the printer 2 stores that print data in the RAM 23. Thereafter, the CPU 21 read outs the print data from the RAM 23, and activates the print mechanism 24 to print it out.

At this time, the print mechanism 24 generates an interrupt IN to the CPU 21 to request print data block by block.

When the interface 25 receives a command from the host computer 1, the CPU 21 of the printer 2 executes a predetermined process according to that command. Then, the CPU 21 of the printer 2 sends response data to the interface 16 of the host computer 1 from the interface 25 via the line 3.

FIG. 2 presents a timing chart illustrating the basic operation of the data line and control signal lines when the interface device sends one block of data.

An interval A in FIG. 2 indicates the operation of state transition means for shifting low-speed transfer to high-speed transfer.

This state transition means causes the interface 16 to set the signal Auto Feed to a high level and set the signal Select In to a low level.

Thereafter, this state transition means causes the interface 25 to set the signal PErrot to a high level and set the signals nFault and Select to a low level.

An interval B in FIG. 2 indicates the operation of high-speed transfer means.

This high-speed transfer means causes the interface 16 to set data (DATA) to be transferred on the data line, and repeatedly set the signal Strobe to a low level and a high level.

An interval C in FIG. 2 indicates the operation of the state transition means for shifting high-speed transfer to low-speed transfer.

This state transition means causes the interface 16 to set the signal Auto Feed to a low level and set the signal Select In to a high level.

Thereafter, this state transition means causes the interface 25 to set the signal PErrot to a low level and set the signals nFAult and Select to a high level.

FIG. 3 presents a timing chart illustrating the basic operation of the data line and control signal lines when the interface device sends plural blocks of data.

An interval A in FIG. 3, like the interval A in FIG. 2, indicates the operation of the state transition means for shifting low-speed transfer to high-speed transfer.

Intervals B1 to Bn in FIG. 3, like the one in FIG. 2, indicate the operation of high-speed transfer means.

An interval C in FIG. 3, like the one in FIG. 2, indicates the operation of the state transition means for shifting high-speed transfer to low-speed transfer.

An interval D in FIG. 3 indicates the operation of synchronous control and error monitoring means which performs synchronous control and error monitoring for each block.

More specifically, when the received block data is normal, this synchronous control and error monitoring means causes the interface 25 to hold the signal Busy at a high level until the printing by the print mechanism 24 is completed.

When an error occurs, the synchronous control and error monitoring means sets the signal PErrot to a low level as indicated by the broken line in FIG. 3.

Figure 4:
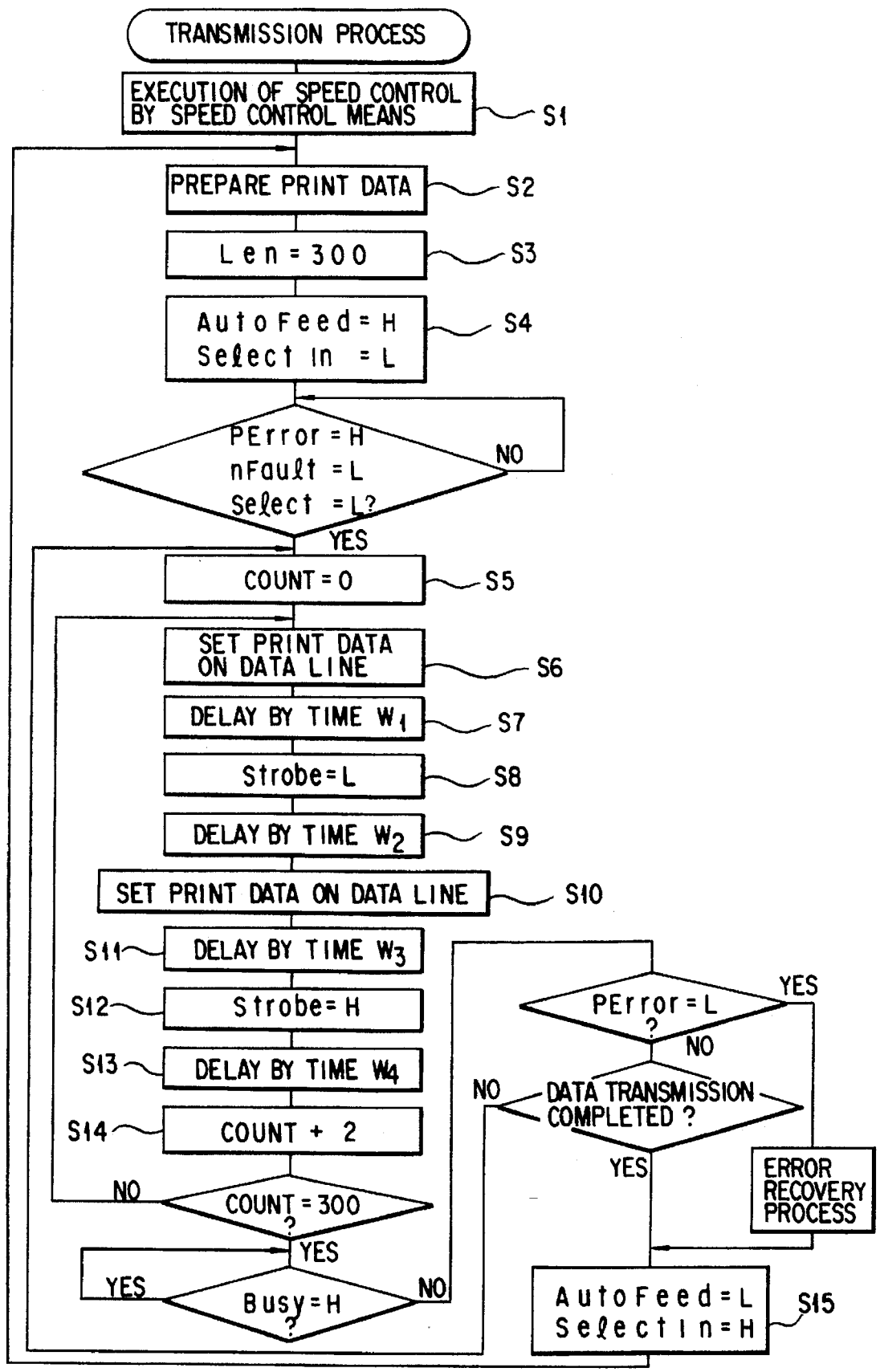
FIG. 4 is a flowchart for explaining a transmission process of a parallel interface of a host computer in this embodiment.

FIG. 4 presents a flowchart illustrating a transmission process that is executed by the CPU 11 of the host computer 1.

In this transmission process, first, speed control means executes speed control, and determines delay times $W_1$ to $W_4$ in step $S_1$.

Next, print data is prepared in step $S_2$, and a block length Len is set to, for example, 300 bytes in step $S_3$.

In the next step $S_4$, the interface 16 sets the signal Auto Feed to a high level and the signal Select In to a low level.

It is then determined if the signal PError from the interface 25 of the printer 2 is at a high level and the signals nFault and Select are at a low level.

When it is detected that the signal PErrot is at a high level and the signals nFault and Select are at a low level, the count value of the counter is set to "0" and the mode is shifted to a high-speed transfer mode in step $S_5$.

When the mode is shifted to the high-speed transfer mode, print data is set on the data line in step $S_6$.

Next, a delay based on the delay time $W_1$ is performed in step $S_7$, the level of the signal Strobe is changed to a high level from a low level in step $S_8$, and a delay based on the delay time $W_2$ is performed next in step $S_9$.

Then, next print data is set in step $S_{10}$.

Next, a delay based on the delay time $W_3$ is performed in step $S_{11}$, the level of the signal Strobe is changed to a high level from the low level in step $S_{12}$, and a delay based on the delay time $W_4$ is performed next in step $S_{13}$.

Then, the count value of the counter is set to +2 in step $S_{14}$.

For high-speed transfer, the processes in steps $S_6$ to $S_{13}$ are repeated until the count value of the counter becomes "300."

When the count value becomes "300," it is determined if the signal Busy from the interface 25 of the printer 2 has changed to a low level from a high level.

If this level change of the signal Busy is detected, it is then determined if the signal PError is at a high level or a low level.

If the signal PError is at a high level, it is discriminated that a block of data has been transferred properly, while if signal PErrot is at a low level, it is discriminated that an error has occurred in the printer 2.

When a block of data has been transferred properly, it is checked if data transmission is completed. When the data transmission is not completed, the flow returns to step $S_5$ and the same processes will be repeated.

When the data transmission is completed, the interface 16 of the printer 2 sets the signal Auto Feed to a low level and the signal Select In to a high level in step $S_{15}$.

When it is discriminated that an error has occurred in the printer 2, an error recovery process is executed before performing the process of step $S_{15}$.

When the process of step $S_{15}$ is finished, the flow returns to step $S_2$.

Figure 5:
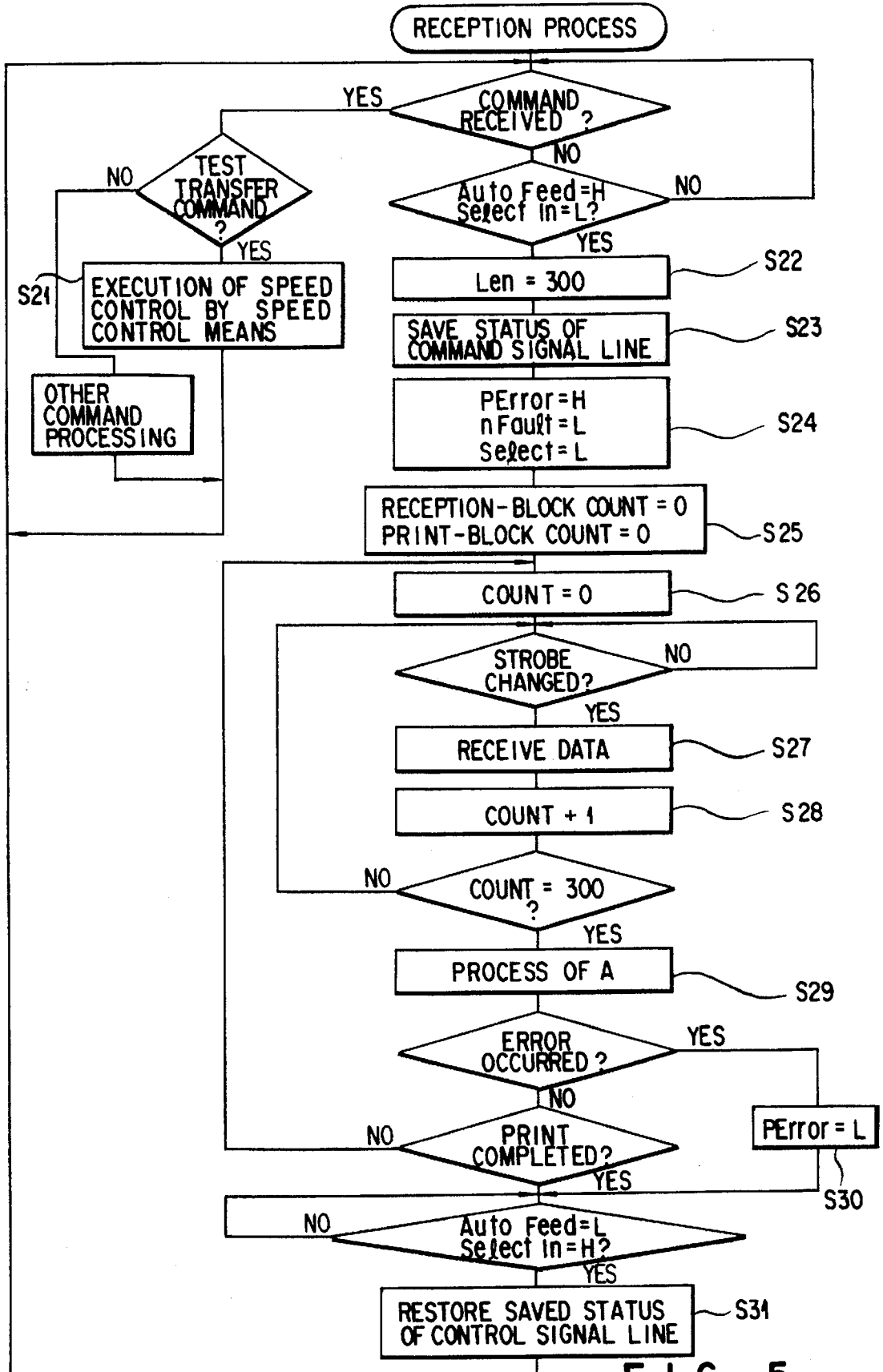
FIG. 5 is a flowchart for explaining a transmission process of a parallel interface of a printer in this embodiment.

FIG. 5 presents a flowchart illustrating the reception process of the laser printer 2.

In this reception process, first, it is determined if the received data is a command.

If it is a command, it is then checked if that command is a test transfer command. If the command is a test transfer command, speed control is executed by the speed control means in step $S_{21}$.

If the received command is other than the test transfer command, a process based on that command is executed.

If the received data is not a command, it is then checked if the signal Auto Feed from the interface 16 of the host computer 1 is at a high level and the signal Select In is at a low level.

When the signal Auto Feed is at a high level and the signal Select In is at a low level, the CPU 21 of the printer 2 determines that there is a print start request or a high-speed transfer request.

Then, the block length Len is set to "300" (Len=300) i step $S_{22}$.

Next, the current status of the associated control signal line is saved in step $S_{23}$, and the signal PError is set to a high level, and the signals nFault and Select are set to a low level in step $SA_{24}$ to enter the high-speed transfer mode.

In step $S_{25}$, the reception-block count value is set to "0" and the print-block count value is also set to "0."

In the next step $S_{26}$, the count value of the counter is set to "0."

When the mode is changed to the high-speed transfer mode, it is checked if the signal Strobe has been changed. When the signal Strobe has been changed, data reception is carried out in step $S_{27}$ and the count value of the counter is incremented by "+1."

The above sequence of processes will be repeated until the count value reaches the block length of "300."

When the count value reaches the block length of "300," a process A which will be discussed later will be executed in step $S_{29}$.

Figure 6:
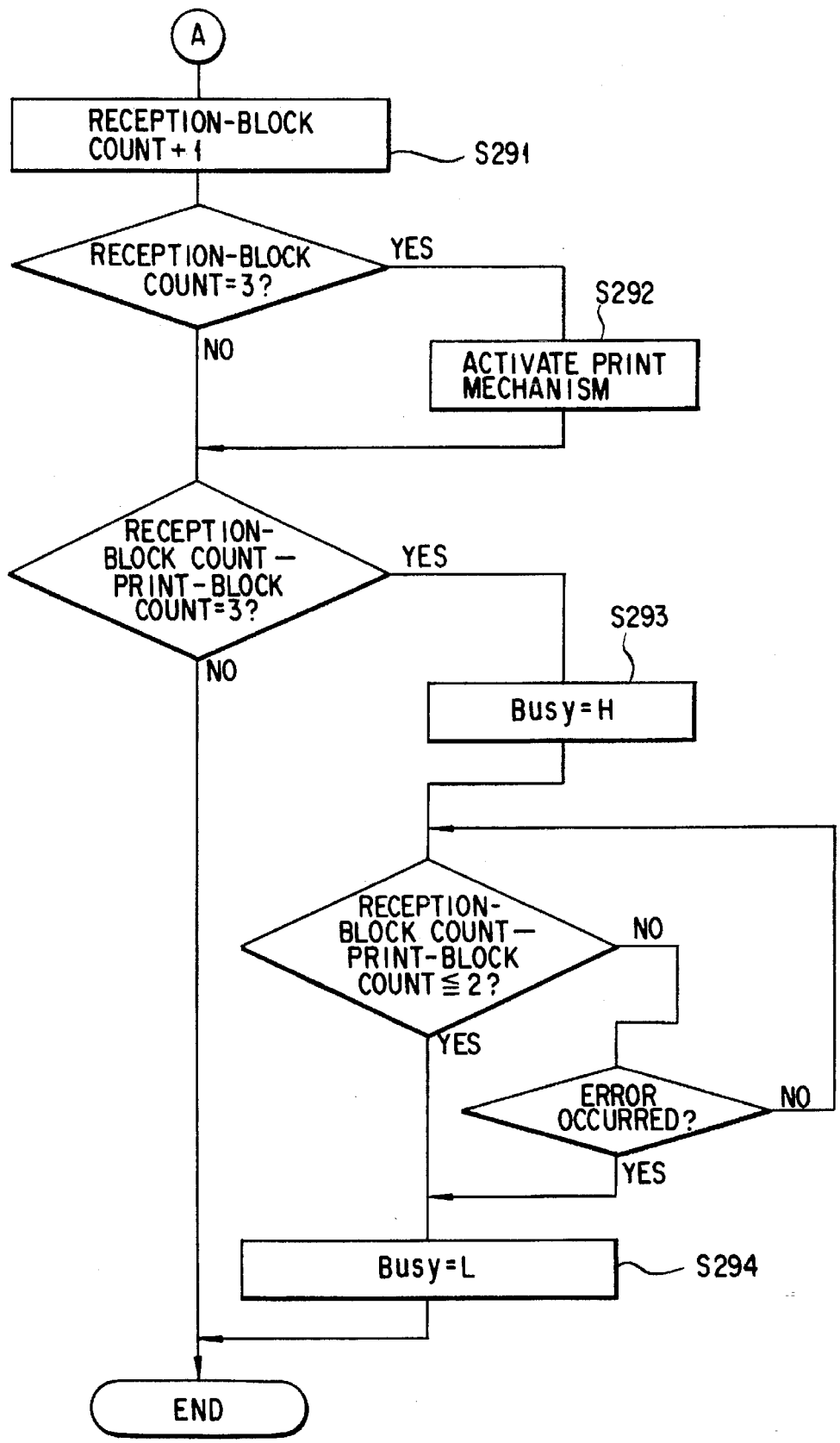
FIG. 6 is a flowchart illustrating a sequence of processes indicated by a mark A in FIG. 5.

The process A is executed as illustrated in FIG. 6.

First, the reception-block count value is incremented by "+1" in step $S_{291}$. It is then checked if the reception-block count value is "3."

When the reception-block count value is "3," it is considered that the initial print data has been prepared and the print mechanism 24 is activated in step $S_{292}$.

When activated, the print mechanism 24 generates an interrupt IN to the CPU 21 to request print data block by block.

The CPU 21 executes an interrupt process by priority over the reception process in response to that interrupt IN from the print mechanism 24.

Figure 7:
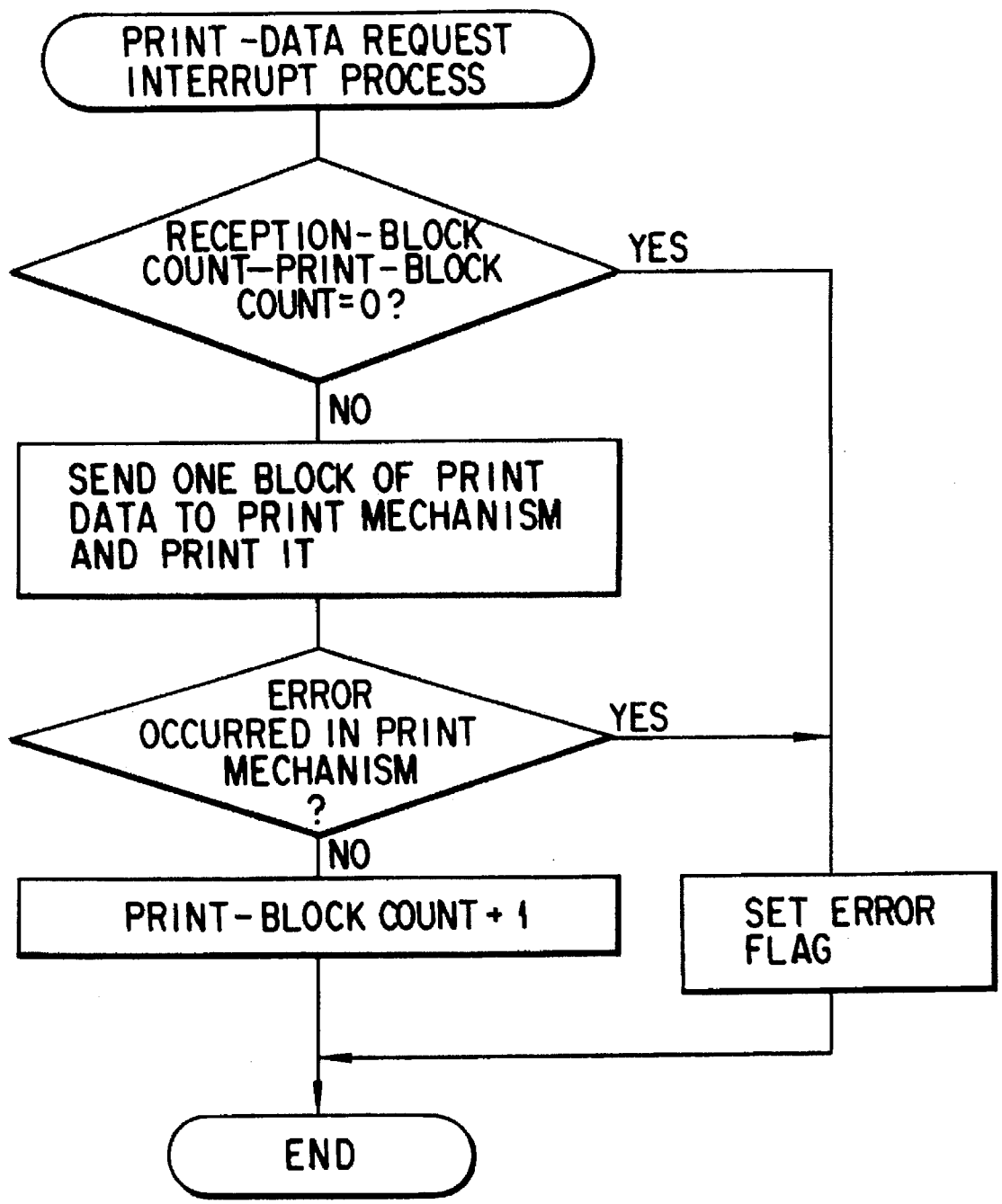
FIG. 7 is a flowchart for explaining an interrupt process for requesting print data of the printer in this embodiment.

In the print data request interrupt process, first, it is checked if there is print data as shown in FIG. 7.

More specifically, the print-block count value is subtracted from the reception-block count value, and if the result is not "0," which is considered that there is print data, the CPU 21 transfers one block of print data to the print mechanism 24 and causes the print mechanism 24 to print it.

If no error occurs in the print mechanism 24, the print-block count value is incremented by "+1" before the interrupt process is terminated.

When the result of the subtraction of the print-block count value from the reception-block count value is "0" or an error has occurred in the print mechanism 24, an error flag is set and the print data request interrupt process will be terminated.

When this print data request interrupt process is terminated, the flow returns to the process shown in FIG. 6, in which it is determined if the result of the subtraction of the print-block count value from the reception-block count value is "3," and if the result is "3," the parallel interface 25 of the printer 2 sets the signal Busy to a high level in step $S_{293}$.

The host computer 1 will not send the next block of print data unless the signal Busy from the printer 2 is at a high level.

And the host computer 1 waits until more than one block of print data is printed by the print mechanism 24. That is, it is determined if the result of the subtraction of the print-block count value from the reception-block count value is equal to or smaller than "2."

If the result is equal to or smaller than "2," it is considered that there is space for more than one block, the level of the signal Busy to be sent to the host computer 1 is set back to the low level from the high level in step $S_{294}$, thus terminating the process A.

If, an error has occurred, the level of the signal Busy to be sent to the host computer 1 is immediately set in step $S_{294}$, back to the low level from the high level thus terminating the process A.

When the process A in step $S_{29}$ in FIG. 5 is terminated, it is checked if another error has occurred.

If no error has occurred, steps $S_{26}$, to $S_{29}$ are repeated until the printing of data is completed.

When an error has occurred, the signal PErrot is set to a low level in step $S_{30}$.

When printing is complete or the signal PErrot is set to the low level due to the occurrence of an error, the CPU 21 waits for the signals Auto Feed and Select In from the host computer 1 to respectively become a low level and a high level. When the signals Auto Feed and Select In respectively become a low level and a high level, the saved status of the control signal line is restored in step $S_{31}$.

The high-speed transfer executed by the above parallel interface device may raise problems of data dropout or double reception of the same data, depending on conditions.
(First Case)

When the processing speed of the host computer is very high, even if the signal Strobe from the host computer 1 changes in synchronism with the transferred data as shown in FIG. 8, the interface 25 of the laser printer 2 will not match the speed, causing dropout in data reception.

For example, the interface 25 may receive transferred data only at every other timing like $t_1$, $t_3$, $t_5$ and $t_7$, or at every third timing like $t_1$, $t_4$ and $t_7$, thus causing data dropout.
(Second Case)

Even when it takes time for the signal Strobe from the interface 16 of the host computer 1 to rise to the high level from the low level, there will not be any problem if the next data is transferred after the level of the signal Strobe reaches the high-level detecting level VLH, as shown in FIG. 9A.

If the next data is transferred before the level of the signal Strobe reaches the level VLH as shown in FIG. 9B due to a very long cable connecting both interfaces 16 and 25 or low performance of the interface 16, the signal Strobe starts changing to the low level before reaching the level VLH.

In this case, the printer 2 cannot receive data, causing data dropout.

(Third Case)

Even if the next data is transferred after the signal Strobe reaches the level VLH, if the signal Strobe takes time to rise to the high level from the low level, the data when the signal Strobe reaches the level VLH may become the same as the data when the signal Strobe falls to or below a low-level detecting level VHL as shown in FIG. 10. In this case, the same data will be received.

The problems of those three cases will be overcome by properly setting the delay time $W_1$ for the signal Strobe to become a low level after data is set, the delay time $W_2$ for the next data to be set after the signal Strobe has become a low level, the delay time $W_3$ for the signal Strobe to start changing to a high level after the data is set, and the delay time $W_4$ for the next data to be set after the signal Strobe has started changing its level to the high level.

This will be discussed more specifically.

In the first case, the data length of the received data is insufficient. To overcome this problem, all the delay times $W_1$ to $W_4$ should be increased.

In the second case, the received data has an insufficient length and the received data is two bytes. To overcome this problem, only the delay time $W_4$ should be increased.

In the third case, the same data will be received twice. To overcome this problem, only the delay time $W_4$ should be increased.

Further, when the data line is under poor conditions, inadequate data may be received. To overcome this problem, all the delay times $W_1$ to $W_4$ should be increased.

Figure 14:
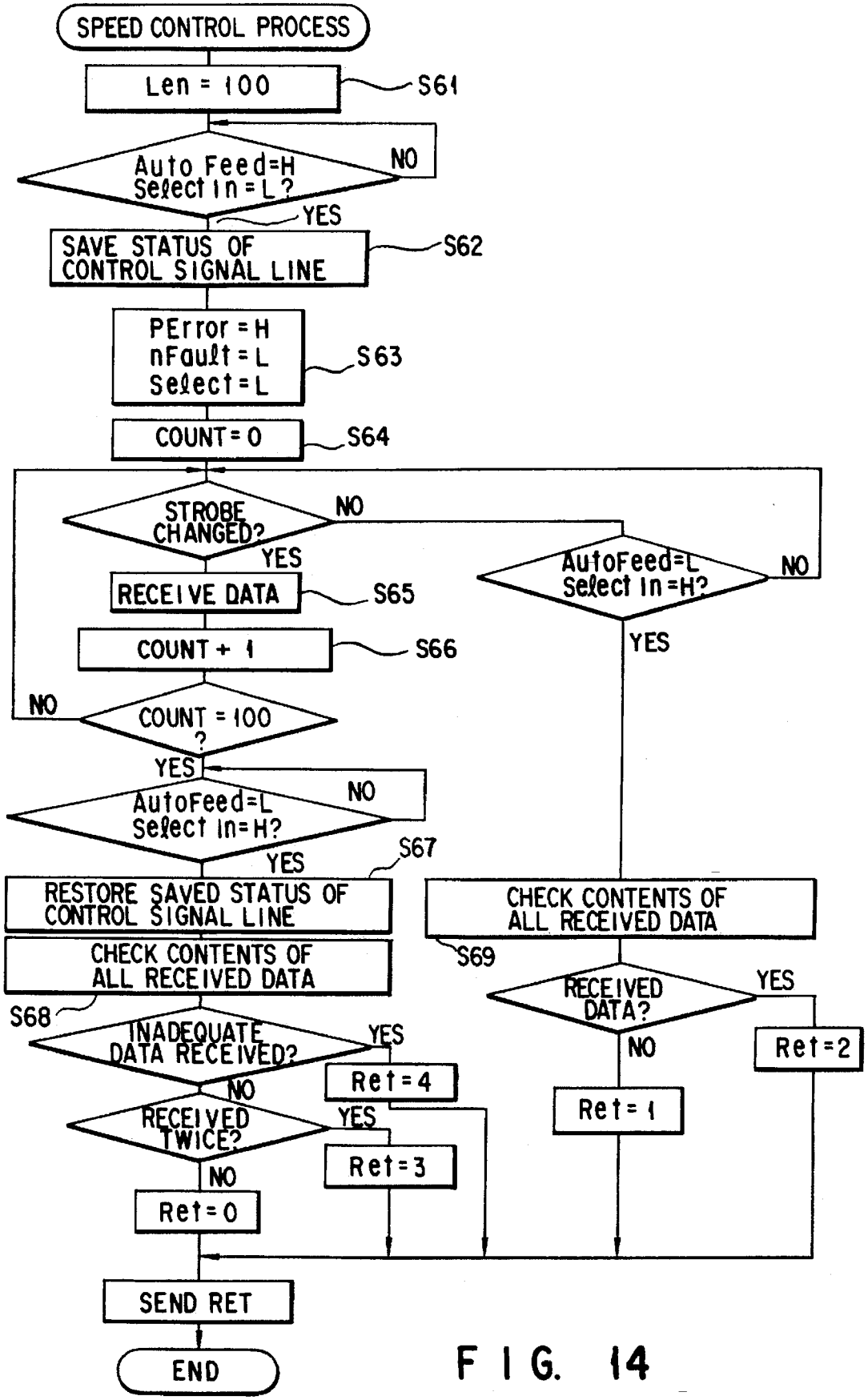
FIG. 14 is a flowchart for explaining a speed control process that is executed by the speed control means at step $S_{21}$ in FIG. 5.

Therefore, in the above-described speed control by the speed control means in step $S_1$ in FIG. 4 and in the above-described speed control by the speed control means in step $S_{21}$ in FIG. 5 when a test transfer command is received, data is transferred to be tested and the delay times $W_1$ to $W_4$ are adjusted if the data transfer between the interfaces 16 and 25 is not proper. More specifically, in the speed control by the speed control means in step $S_1$ in FIG. 4 under the control of the CPU 11 of the host computer 1, the process shown in FIG. 12 is executed, while the speed control by the speed control means in step $S_{21}$ in FIG. 5 that is initiated by the laser printer 2, the process shown in FIG. 14 is executed.

Figure 12:
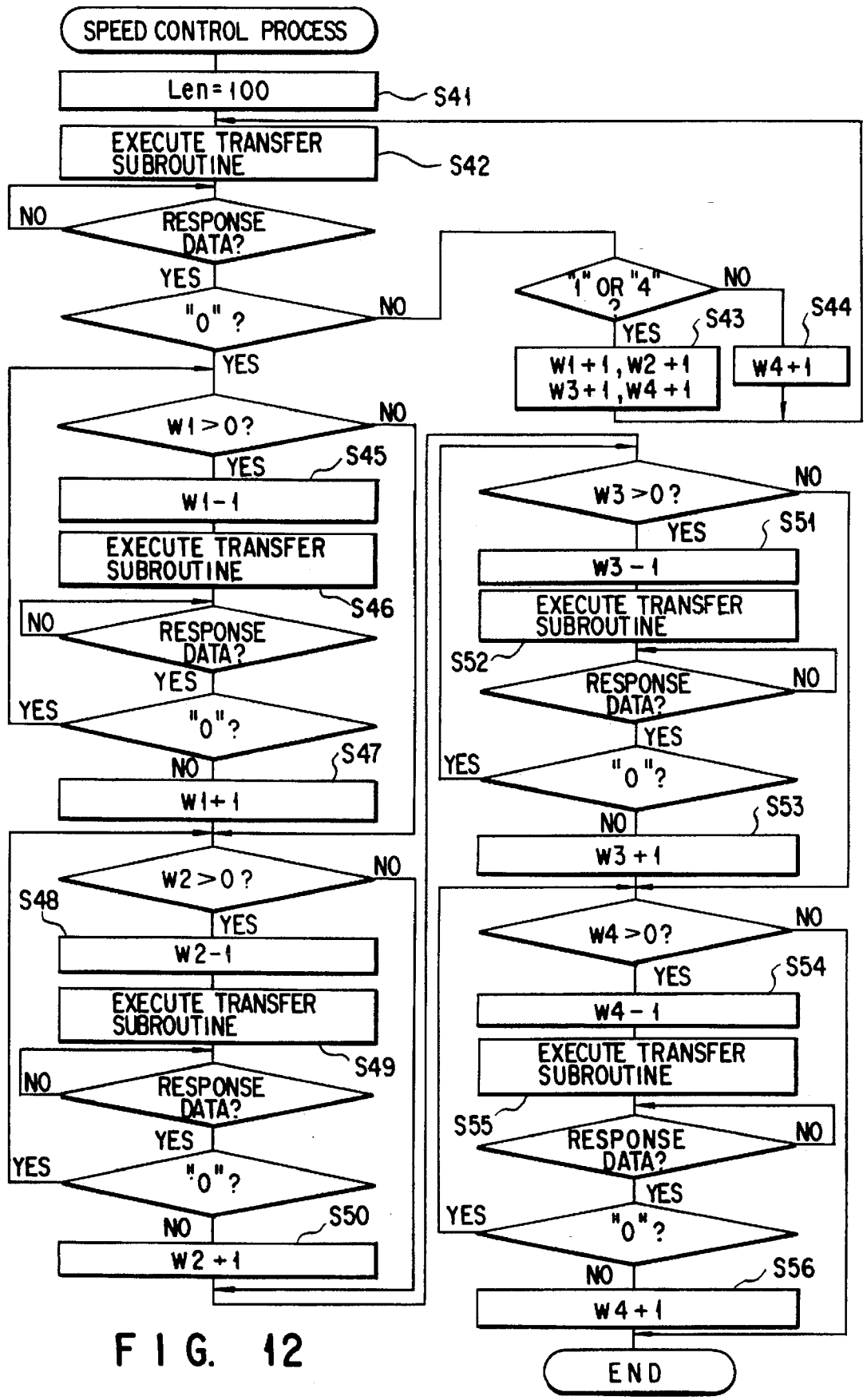
FIG. 12 is a flowchart for explaining a speed control process that is executed by speed control means at step S 1 in FIG. 4.

In the speed control process in FIG. 12, the data length Len is set to "100" in step $S_{41}$, which means that 100 bytes of data having values 1 to 100 are to be transferred as test data.

Figure 13:
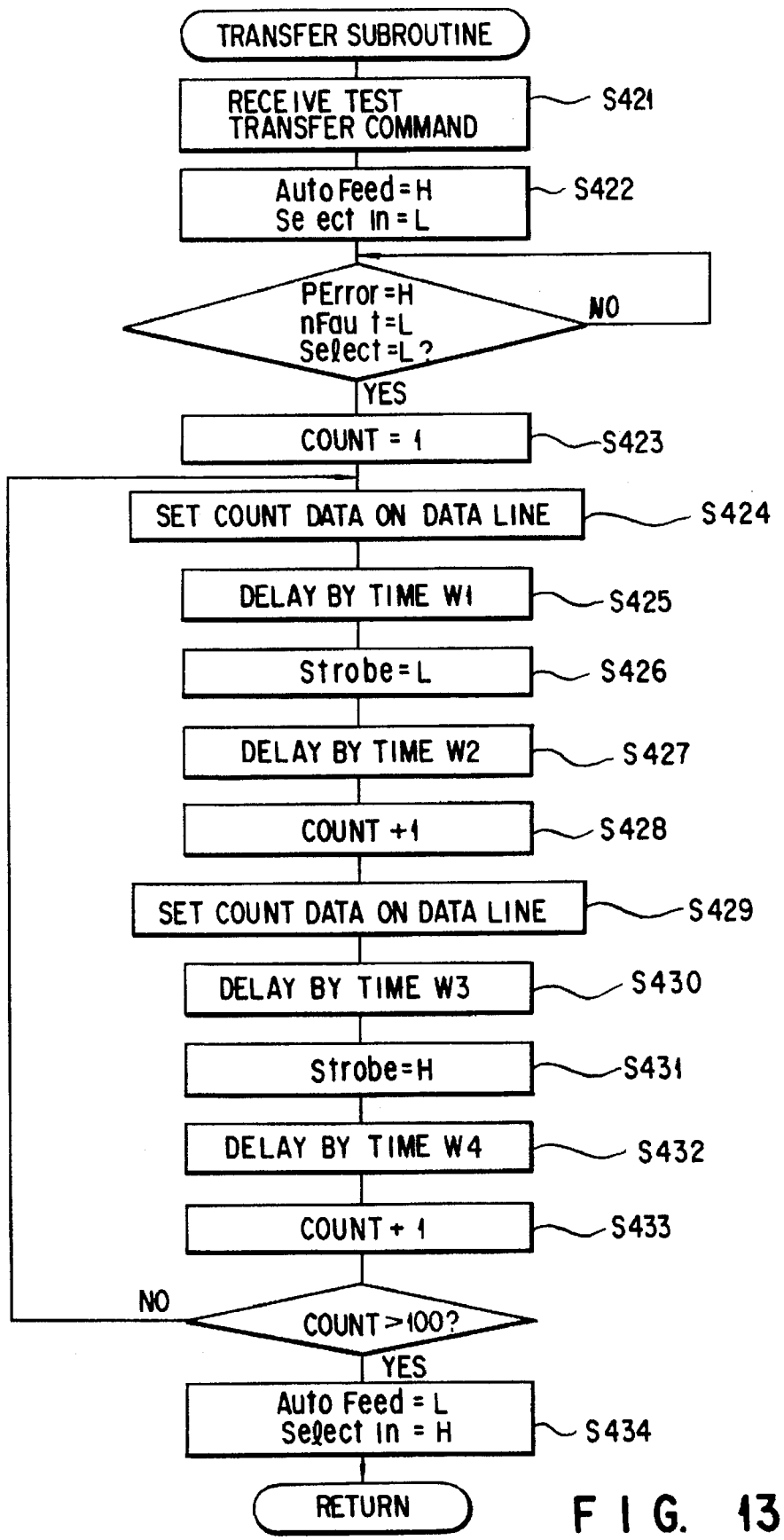
FIG. 13 is a flowchart for explaining processes that are executed by a transfer subroutine at steps $S_{42}$, $S_{46}$, $S_{49}$, $S_{52}$ and $S_{55}$ in FIG. 12.

Then, a transfer subroutine is executed in step $S_{42}$ along the flowchart shown in FIG. 13.

In this transfer subroutine, first, a test transfer command is sent to the printer 2 in step $S_{421}$.

In the next step $S_{422}$, the signal Auto Feed is set to a high level and the signal Select In to a low level.

It is then determined if the signal PErrot from the parallel interface 25 of the printer 2 is at a high level and the signals nFault and Select are at a low level.

When it is detected that the signal PErrot is at a high level and the signals nFault and Select are at a low level, the count value of the counter is set to "1" and the mode is shifted to the high-speed transfer mode in step $S_{423}$.

When the mode is shifted to the high-speed transfer mode, count data is set on the data line first in step $S_{424}$.

Next, a delay based on the delay time $W_1$ is performed in step $S_{425}$.

Then, the level of the signal Strobe is changed to a low level from a high level in step $S_{426}$.

Then, a delay based on the delay time $W_2$ is performed in step $S_{427}$.

In the next step S 428, the count value is incremented by "+1."

Subsequently, the next count data is set on the data line in step $S_{429}$.

Next, a delay based on the delay time $W_3$ is performed in step $S_{430}$.

Then, the level of the signal Strobe is changed to a high level from a low level in step $S_{431}$.

Then, a delay based on the delay time $W_4$ is performed in step $S_{432}$.

In the next step $S_{433}$, the count value is incremented by "+1."

The processes of steps $S_{424}$ to $S_{433}$ will be repeated until the count value exceeds "100."

When the count value exceeds "100," the signal Auto Feed is set to a low level and the signal Select In to a high level in step $S_{434}$.

Under this condition, the CPU 11 waits for response data from the printer 2, terminating the transfer subroutine. The flow then returns to the speed control process shown in FIG. 12.

In the speed control process shown in FIG. 12, when the transfer subroutine in step $S_{42}$ is terminated, it is checked if the response data is "0," "1" or "4" or other than those three.

When the response data is "1" or "4," the delay times $W_1$ to $W_4$ are incremented by "+1" in step $S_{43}$ before the flow returns to the execution of the transfer subroutine in step $S_{42}$.

That is, the test transfer command is sent again to the printer 2 to test again if data is properly transferred.

When the response data is "2" or "3," the delay time $W_4$ is incremented by "+1" in step $S_{44}$ before the flow returns to the execution of the transfer subroutine in step $S_{42}$.

That is, the test transfer command is sent again this time to the printer 2 to test again if data is properly transferred.

When the response data is "0," it is considered that data transfer has been conducted properly, and it is then checked if the delay time $W_1$ is greater than "0" ($W_1>0$).

When $W_1>0$, the delay time $W_1$ is decremented by "1" in step $S_{45}$.

Next, the transfer subroutine is executed in step $S_{46}$ in the same manner as done in step $S_{42}$.

And the response data is checked and if the response data is "0," it is again checked if $W_1>0$.

When the response data is not "0," the delay time $W_1$ is incremented by "+1" in step $S_{47}$ and it is then checked if the delay time $W_2$ is greater than "0" ($W_2>0$).

Even when $W_1$ is not greater than "0," it is checked if the delay time $W_2$ is>"0."

When $W_2>0$, the delay time $W_2$ is decremented by "1" in step $S_{48}$.

In the next step $S_{49}$, the transfer subroutine is executed in the same manner as done in step $S_{42}$.

And the response data is checked and if the response data is "0," it is again checked if $W_2>0$.

When the response data is not "0," the delay time $W_2$ is incremented by "+1" in step $S_{50}$ and it is then checked if the delay time $W_3$ is greater than "0" ($W_3>0$).

Even when $W_2$ is not greater than "0," it is checked if the delay time $W_3$>"0."

When $W_3>0$, the delay time $W_3$ is decremented by "1" in step $S_{51}$.

In the next step $S_{52}$, the transfer subroutine is executed in the same manner as done in step $S_{42}$.

And the response data is checked and if the response data is "0," it is again checked if $W_3>0$.

When the response data is not "0," the delay time $W_3$ is incremented by "+1" in step $S_{53}$ and it is then checked if the delay time $W_4$ is greater than "0" ($W_4>0$).

Even when $W_3$ is not greater than "0," it is checked if the delay time $W_4>$"0."

When $W_4>0$, the delay time $W_4$ is decremented by "1" in step $S_{54}$.

In the next step $S_{55}$, the transfer subroutine is executed in the same manner as done in step $S_{42}$.

And the response data is checked and if the response data is "0," it is again checked if $W_4>0$.

If the response data is not "0," the delay time $W_4$ is incremented by "+1" in step $S_{56}$ before terminating this speed control process.

Even when the delay time $W_3$ is not greater than "0," this speed control process is terminated.

In the speed control process in FIG. 14, first, the data length Len is set to "100" in step $S_{61}$, by which the data length is set to that of the test data set by the host computer 1.

Under this condition, it is checked if the signals Auto Feed and Select In received from the host computer 1 are respectively at a high level and a low level.

When the signals Auto Feed and Select In are respectively at a high level and a low level, which is considered as a print start request or a high-speed transfer request, the current statuses of the associated control signal lines are saved in step $S_{62}$.

And the signal PErfor is set to a high level and the signal nFault and Select is set to a low level to shift to the high-speed transfer mode in step $S_{63}$.

Subsequently, the count value of the counter is set to "0" in step $S_{64}$.

When the mode is shifted to the high-speed transfer mode, first, it is checked if the signal Strobe has been changed.

If the signal Strobe has been changed, data reception is executed in step $S_{65}$.

Subsequently, the count value of the counter is incremented by "+1" in step $S_{66}$.

The above processing will be repeated until the count value becomes the block length of "100."

When the count value reaches the block length of "100," it is checked if the signals Auto Feed and Select In from the host computer 1 have respectively changed their levels to a low level and a high level.

If such level changes have been detected, the saved statuses of the control signal lines are restored in step $S_{67}$.

Then, the contents of all the received data are checked in step $S_{68}$. If the received data contains inadequate data, "4" is set as response data Ret, and this response data Ret=4 will be sent to the host computer 1.

If the received data contains double-received data, "3" is set as response data Ret, and this response data Ret=3 will be sent to the host computer 1.

If the entire received data is normal, "0" is set as response data Ret, and this response data Ret=0 will be sent to the host computer 1.

If it is detected that the signal Auto Feed has changed to a low level and the signal Select In to a high level even though the signal Strobe has not changed, the contents of the entire received data are checked in step $S_{69}$.

If the received data contains 2-byte data, "2" is set as response data Ret, and this response data Ret=2 will be sent to the host computer 1.

If the received data does not contain 2-byte data, "1" is set as response data Ret, and this response data Ret=1 will be sent to the host computer 1.

The operation of this embodiment will now be described.

Before sending print data to the printer 2, the host computer sends 100-byte numeral data having values 1 to 100 as test data to the printer 2 to test if data transfer between the interfaces 16 and 25 is properly carried out.

If the data received by the printer 2 in this transmission of the test data contains inadequate data, the response data Ret=4 is sent to the host computer 1.

If the data received by the printer 2 contains double-received data, the response data Ret=3 is sent to the host computer 1.

If the whole received data is normal, the response data Ret=0 is sent to the host computer 1.

If the signals Auto Feed and Select In from the host computer 1 respectively change to a low level and a high level even though the signal Strobe has not changed, the printer 2 sends the response data Ret=2 to the host computer 1 when the received data is 2 bytes.

When the received data is not 2 bytes in this case, the printer 2 sends the response data Ret=1 to the host computer 1.

By executing the above-described test transfer control, the interface 16 of the host computer 1 adjusts the delay times $W_1$ to $W_4$ shown in FIG. 11 so that data will be transferred accurately. That is, the interface 16 adjusts the data transfer rate.

When the adjustment of the delay times $W_1$ to $W_4$ is completed, the host computer 1 prepares print data and sends it to the printer 2. At this time, the host computer sends the print data block by block consisting of 300 bytes.

The interface 16 of the host computer 1 sets the signal Auto Feed to a high level and the signal Select In to a low level.

Accordingly, the interface 25 of the printer 2 saves the current statuses of the control signal lines and sets the signal PErrot to a high level and the signals nFault and signal Select to a low level.

The transition to the high-speed transfer is accomplished in this manner.

Under this condition, the host computer 1 sets 1-byte print data on the data line of the interface 16, and changes the signal Strobe to the low level from the high level after the delay time $W_1$ passes.

Then, the host computer 1 sets the next 1-byte print data on the data line after the passage of the delay time $W_2$, and changes the signal Strobe to the high level from the low level after the passage of the delay time $W_3$.

Then, the host computer 1 sets the third-byte print data on the data line after the passage of the delay time $W_4$.

In this manner, the host computer 1 sends print data byte by byte to the printer 2 at a high speed while setting print data on the data line and changing the level of the signal Strobe at the timings of the adjusted delay times $W_1$ to $W_4$.

The interface 25 of the printer 2 receives 1-byte print data every time the signal Strobe changes to a low level from a high level or vice versa.

When one block of print data is received or print data of the 300-th byte is received, the reception-block count value is incremented by "1" and it is checked if the reception-block count value is "3".

If the reception-block count value is "3," it is considered that initial print data has been prepared, and the print mechanism 24 is activated.

When activated, the print mechanism 24 generates a print data request interrupt to the CPU 21 block by block.

The CPU 21 initiates an interrupt process by priority over the reception process in response to that interrupt.

In the print data request interrupt process, the CPU 21 checks if there is print data. When the print data exists, the CPU 21 sends the print data to the print mechanism 24 to print it out, and if there is no error, the print-block count value is incremented by "1" to terminate the printing of one block.

In the reception process, the CPU 21 subtracts the print-block count value from the reception-block count value and determines if the result is "3." If the result is "3," the CPU 21 sets the signal Busy to the host computer 1 to a high level.

As long as the signal Busy from the printer 2 is at a high level, the host computer 1 will not send the next one block of print data.

In this reception process, the CPU 21 waits for the print mechanism 24 to print one block or more of print data, and returns the signal Busy to the low level from the high level if space for one block or more is made.

When the signal Busy becomes a low level, the host computer 1 prepares the next block of print data and sends it to the printer 2 in the manner explained above.

As long as no error occurs, the printer 2 receives and prints the print data from the host computer 1 block by block.

When printing is complete, the CPU 21 restores the saved statuses of the control signal lines to the original statuses after detecting that the signal Auto Feed has changed to a low level and the signal Select In to a high level.

The high-speed transfer state is changed to the original state between the interfaces 16 and 25.

According to this embodiment, as described above, print data can be sent at a high speed to the printer from the host computer 1 using the parallel interfaces 16 and 25, and even a vast amount of print data can be sent to the printer 2 promptly.

In addition, the print data is sent to the printer 2 from the host computer 1 block by block consisting of 300 bytes, and the printer 2 prints out the received print data while receiving the next block of print data. This design eliminates the need for a large-capacity page memory in the printer 2, but, instead, allows for the use of a buffer memory of about 900 bytes sufficient to store three blocks of print data, thus contributing to the cost reduction.

As the print data is transferred at a high speed, the printing speed will be improved.

When an error occurs during printing by the printer 2 which is receiving the next block of print data at the same time, the printer 2 sets the signal PError to a low level to inform the host computer 1 of the occurrence of an error. This permits the host computer 1 to immediately perform an error recovery process.

Further, the host computer 1 sends a test transfer command to the printer 2 before sending print data, and sends test data to the printer 2 to check if data is transferred correctly.

If accurate data transfer is not accomplished, the delay times $W_1$ to $W_4$ which determine the timings at which the print data is to be set on the data line and the level of the signal Strobe is to be changed, are adjusted, and transfer of print data starts only when accurate data transfer becomes possible. This will ensure accurate transfer of print data to the printer 2 from the host computer 1.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data transfer system for transferring data from a data transmission apparatus to a data reception apparatus via a parallel interface, said parallel interface including a plurality of control signal lines for control signal transfer and a data line for parallel transfer of data having a predetermined bit width, said data transmission apparatus comprising:

first high-speed data transfer means for changing a level of a data transmission signal sent over one of said plurality of control signal lines, and for transferring data in parallel to said data reception apparatus over said data line at a timing of that level change;

first state transition means for changing a level of a control signal sent over said plurality of control signal lines to predetermined states;

wherein said first high-speed data transfer means is responsive to a single change in the level of the control signal so as to enable said first high-speed data transfer means to both start and end high-speed data transfer;

means for sending test data to said data reception apparatus;

means for determining a delay time at a time of transmitting data, based on a result of discrimination of a reception status of said test data, received from said data reception apparatus;

second high-speed data transfer means for delaying data to be sent based on said delay time determined by said determining means, for changing a level of a data transmission signal sent over one of said plurality of control signal lines, and for transferring data in parallel to said data reception apparatus over said data line at a timing of that level change; and second state transition means for changing a level of a control signal sent over said plurality of control signal lines to predetermined states; and wherein said second high speed data transfer means is responsive to a single change in the level of the control signal so as to enable said second high-speed data transfer means to both start and end high-speed data transfer; and wherein said data reception apparatus includes data discriminating means for receiving said test data from said data transmission apparatus, for discriminating a reception status of said test data, and for sending a discrimination result to said data transmission apparatus.

2. The data transfer system according to claim 1, wherein:

said parallel interface comprises a Centronics compatible parallel interface; and said first high-speed data transfer means of said data transmission apparatus changes a level of a signal Strobe, and transfers data in parallel to said data reception apparatus over said data line at a timing of that level change.

3. The data transfer system according to claim 1, wherein:

said parallel interface comprises a Centronics compatible parallel interface;

said first high-speed data transfer means of said data transmission apparatus changes a level of a signal Strobe, and transfers data in parallel to said data reception apparatus over said data line at a timing of that level change; and said first state transition means of said data transmission apparatus permits said first high-speed data transfer means to both start and end high-speed data transfer in accordance with a single level change in at least one of a signal Auto Feed, a signal Select In, a signal PError, a signal nFault and a signal Select.

4. A data transfer system for transferring data from a data transmission apparatus to a printer via a parallel interface, said parallel interface including a plurality of control signal lines for control signal transfer and a data line for parallel transfer of data having a predetermined bit width, said data transmission apparatus comprising:

first high-speed data transfer means for transferring data in parallel to said printer over said data line at a timing at which a data transmission signal sent over one of said plurality of control signal lines changes its level;

first state transition means for changing a level of a control signal sent over said plurality of control signal lines to predetermined states;

wherein said first high speed data transfer means is responsive to a single change in the level of the control signal so as to enable said first high-speed data transfer means to both start and end high-speed data transfer;

synchronous control and error monitoring means for dividing data to be sent to said printer into blocks and for performing synchronous control and error monitoring for each block;

whereby said printer prints data, received via said parallel interface, block by block;

means for sending a test transfer command including test data to said printer;

means for determining a delay time at a time of transmitting data, based on a result of discrimination of a reception status of said test data, received from said printer;

second high-speed data transfer means for delaying data to be sent based on said delay time determined by said determining means, for changing a level of a data transmission signal to be sent over one of said plurality of control signal lines, and for transferring data in parallel to said printer over said data line at a timing of that level change; and second state transition means for changing a level of a control signal sent over said plurality of control signal lines to predetermined states; and wherein said second high speed data transfer means is responsive to a single change in the level of the control signal so as to enable said second high-speed data transfer means to both start and end high-speed data transfer; and wherein said printer includes data discriminating means for receiving said test data from said data transmission apparatus, for discriminating a reception status of said test data, and for sending a discrimination result to said data transmission apparatus.

* * * * *